(12) United States Patent
Al-Nakhli et al.

(10) Patent No.: US 9,963,631 B2
(45) Date of Patent: *May 8, 2018

(54) COMPOSITION FOR ENHANCED FRACTURE CLEANUP USING REDOX TREATMENT

(71) Applicant: Saudi Arabian Oil Company, Dhahran (SA)

(72) Inventors: Ayman R. Al-Nakhli, Dhahran (SA); Hazim H. Abass, Dhahran (SA); Ahmad S. Al-Otaibi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days. days.

This patent is subject to a terminal disclaimer.

(21) Appl. No.: 15/162,831

(22) Filed: May 24, 2016

(65) Prior Publication Data

US 2016/0264859 A1 Sep. 15, 2016

Related U.S. Application Data

(62) Division of application No. 14/689,901, filed on Apr. 17, 2015.

(60) Provisional application No. 61/980,664, filed on Apr. 17, 2014.

(51) Int. Cl.
| | |
|---|---|
| *C09K 8/90* | (2006.01) |
| *C09K 8/66* | (2006.01) |
| *C09K 8/80* | (2006.01) |
| *E21B 43/24* | (2006.01) |
| *E21B 43/26* | (2006.01) |
| *E21B 43/267* | (2006.01) |
| *C09K 8/52* | (2006.01) |
| *C09K 8/62* | (2006.01) |
| *E21B 37/00* | (2006.01) |
| *C09K 8/592* | (2006.01) |

(52) U.S. Cl.
CPC .............. *C09K 8/90* (2013.01); *C09K 8/52* (2013.01); *C09K 8/62* (2013.01); *C09K 8/665* (2013.01); *C09K 8/80* (2013.01); *E21B 37/00* (2013.01); *E21B 43/2405* (2013.01); *E21B 43/26* (2013.01); *E21B 43/267* (2013.01); *C09K 8/592* (2013.01)

(58) Field of Classification Search
CPC ... C09K 8/90; C09K 8/62; C09K 8/52; C09K 8/80; C09K 8/665; E21B 37/00; E21B 43/2405; E21B 43/267; E21B 43/26
See application file for complete search history.

(56) References Cited

U.S. PATENT DOCUMENTS

| | | |
|---|---|---|
| 1,819,055 A | 8/1931 | Jan Al et al. |
| 1,990,969 A | 2/1935 | Wilson |
| 2,094,479 A | 9/1937 | Vandergrift |
| 2,288,556 A | 6/1942 | Vollmer |
| 2,466,674 A | 4/1949 | Mullady |
| 2,606,813 A | 8/1952 | Kahr |
| 2,699,213 A | 1/1955 | Cardwell et al. |
| 2,885,004 A | 5/1959 | Perry |
| 3,025,911 A | 3/1962 | Bergman |
| 3,354,954 A | 11/1967 | Buxton |
| 3,385,360 A | 5/1968 | Smith |
| 3,405,761 A | 10/1968 | Parker |
| 3,476,183 A | 11/1969 | Haynes, Jr. et al. |
| 3,483,923 A | 12/1969 | Darley |
| 3,543,856 A | 12/1970 | Knox et al. |
| 3,568,772 A | 3/1971 | Gogarty et al. |
| 3,576,596 A | 4/1971 | Kranc et al. |
| 3,707,192 A | 12/1972 | Goins, Jr. et al. |
| 3,712,380 A | 1/1973 | Caffey |
| 3,719,228 A | 3/1973 | Carcia |
| 3,760,881 A | 9/1973 | Kiel |
| 3,828,854 A | 8/1974 | Templeton et al. |
| 3,864,451 A | 2/1975 | Lee et al. |
| 4,056,146 A | 11/1977 | Hall |
| 4,085,799 A | 4/1978 | Bousaid et al. |
| 4,136,739 A | 1/1979 | Salathiel et al. |
| 4,158,042 A | 6/1979 | Deutschman |
| 4,178,993 A | 12/1979 | Richardson et al. |

(Continued)

FOREIGN PATENT DOCUMENTS

| | | |
|---|---|---|
| CN | 101323780 A | 12/2008 |
| CN | 101839123 A | 9/2010 |

(Continued)

OTHER PUBLICATIONS

Ashton, J.P., et al., "In-Situ Heat System Stimulates Paraffinic-Crude Producers in Gulf of Mexico," SPE 15660, SPE Production Engineering, May 1989, pp. 157-160, vol. 4, No. 2, Society of Petroleum Engineers.
Database WPI, Week 201115, XP-002693470, Thomson Scientific, London, GB, C:\EPOPROGS\SEA\.\..\.. \epodata\sea\eplogf\internal.log.
Khalil, C.N., et al., "Detection of Formation Damage Associated to Paraffin in Reservoirs of the Reconcavo Baiano, Brazil," SPE 37238, Int'l Symposium on Oilfield Chemistry held in Houston, TX, Feb. 18-21, 1997, Society of Petroleum Engineers, Inc.
Kiryukhin, et al., Thermal-Hydrodynamic Modeling of Laboratory Tests on the Interaction of NaNO3—NaOH Fluids with Sandstone Rock at a Deep Radionuclide Repository Site, pp. 1-20, Russia.

(Continued)

*Primary Examiner* — Silvana C Runyan
(74) *Attorney, Agent, or Firm* — Bracewell LLP; Constance G. Rhebergen; Kevin R. Tamm

(57) ABSTRACT

A composition for improved hydrocarbon recovery from a formation due to cleanup of a residual viscous material is provided. The composition comprises an acid precursor, the acid precursor operable to trigger an exothermic reaction component; and the exothermic reaction component operable to generate heat, where the heat is operable to reduce a viscosity of the residual viscous material to create a reduced viscosity material, the reduced viscosity material operable to flow from the fractures.

15 Claims, 4 Drawing Sheets

(56) References Cited

U.S. PATENT DOCUMENTS

| | | | |
|---|---|---|---|
| 4,210,628 A | 7/1980 | Ninomiya et al. | |
| 4,219,083 A | 8/1980 | Richardson et al. | |
| 4,232,740 A | 11/1980 | Park | |
| 4,232,741 A | 11/1980 | Richardson et al. | |
| 4,291,765 A | 9/1981 | Gilchrist et al. | |
| 4,330,037 A | 5/1982 | Richardson et al. | |
| 4,399,868 A | 8/1983 | Richardson et al. | |
| 4,410,041 A | 10/1983 | Davies et al. | |
| 4,414,118 A | 11/1983 | Murphey | |
| 4,454,918 A | 6/1984 | Richardson et al. | |
| 4,475,595 A | 10/1984 | Watkins et al. | |
| 4,482,016 A * | 11/1984 | Richardson | C09K 8/72 166/300 |
| 4,485,007 A | 11/1984 | Tam et al. | |
| 4,491,180 A | 1/1985 | Brown et al. | |
| 4,518,040 A | 5/1985 | Middleton | |
| 4,572,297 A | 2/1986 | Thigpen, Jr. et al. | |
| 4,615,391 A | 10/1986 | Garthoffner | |
| 4,703,803 A | 11/1987 | Blumer | |
| 4,842,073 A | 6/1989 | Himes et al. | |
| 4,846,277 A | 6/1989 | Khalil et al. | |
| 4,865,826 A | 9/1989 | Carnell et al. | |
| 4,898,750 A | 2/1990 | Friedman et al. | |
| 4,919,209 A | 4/1990 | King | |
| 5,082,058 A | 1/1992 | Blumer | |
| 5,087,350 A | 2/1992 | Paris-Marcano | |
| 5,152,906 A | 10/1992 | Aften et al. | |
| 5,183,581 A | 2/1993 | Khalil et al. | |
| 5,197,544 A | 3/1993 | Himes | |
| 5,209,295 A | 5/1993 | Campos et al. | |
| 5,342,530 A | 8/1994 | Aften et al. | |
| 5,358,565 A | 10/1994 | Shu | |
| 5,375,660 A | 12/1994 | Wehunt | |
| 5,411,094 A | 5/1995 | Northrop | |
| 5,639,313 A | 6/1997 | Khalil | |
| 5,958,224 A | 9/1999 | Ho et al. | |
| 6,035,933 A | 3/2000 | Khalil et al. | |
| 6,277,271 B1 | 8/2001 | Kocal | |
| 6,500,219 B1 | 12/2002 | Gunnerman | |
| 6,554,071 B1 | 4/2003 | Reddy et al. | |
| 6,662,874 B2 | 12/2003 | Surjaatmadja et al. | |
| 6,722,434 B2 | 4/2004 | Reddy et al. | |
| 6,827,845 B2 | 12/2004 | Gong et al. | |
| 6,881,325 B2 | 4/2005 | Morris et al. | |
| 6,986,392 B2 | 1/2006 | Chatterji | |
| 6,992,048 B2 | 1/2006 | Reddy et al. | |
| 7,029,639 B2 | 4/2006 | Yasutake et al. | |
| 7,059,414 B2 | 6/2006 | Rae et al. | |
| 7,066,260 B2 | 6/2006 | Sullivan et al. | |
| 7,153,434 B1 | 12/2006 | Dennis | |
| 7,328,746 B2 | 2/2008 | Al-Taq et al. | |
| 7,540,328 B2 | 6/2009 | Brown et al. | |
| 7,589,050 B2 | 9/2009 | Frenier et al. | |
| 7,624,743 B2 | 12/2009 | Sarkar et al. | |
| 7,686,084 B2 | 3/2010 | Reddy et al. | |
| 7,779,915 B2 | 8/2010 | Hutchins et al. | |
| 7,947,629 B2 | 5/2011 | Fuller | |
| 8,096,361 B2 | 1/2012 | Willberg | |
| 8,216,344 B2 | 7/2012 | Degenstein et al. | |
| 8,282,715 B1 | 10/2012 | Degenstein et al. | |
| 8,962,536 B2 | 2/2015 | Winslow et al. | |
| 2003/0092581 A1 | 5/2003 | Crews | |
| 2003/0221831 A1 | 12/2003 | Reddy et al. | |
| 2005/0000694 A1 | 1/2005 | Dalrymple et al. | |
| 2005/0215439 A1 | 9/2005 | Blair | |
| 2006/0144591 A1 | 7/2006 | Gonzalez et al. | |
| 2006/0154814 A1 | 7/2006 | Zanibelli et al. | |
| 2006/0258541 A1* | 11/2006 | Crews | C09K 8/52 507/203 |
| 2008/0066784 A1 | 3/2008 | Sarkar et al. | |
| 2008/0069961 A1* | 3/2008 | Sarkar | C09K 8/524 427/384 |
| 2008/0119374 A1* | 5/2008 | Willberg | C09K 8/72 507/209 |
| 2008/0121395 A1 | 5/2008 | Reddy | |
| 2008/0190607 A1 | 8/2008 | Minnich et al. | |
| 2008/0190610 A1 | 8/2008 | Barmatov et al. | |
| 2008/0289828 A1 | 11/2008 | Hutchins et al. | |
| 2008/0318812 A1 | 12/2008 | Kakadjian, Sr. et al. | |
| 2009/0098467 A1 | 4/2009 | Lowe et al. | |
| 2010/0056399 A1 | 3/2010 | Berkland et al. | |
| 2010/0155303 A1 | 6/2010 | Toida et al. | |
| 2010/0170453 A1 | 7/2010 | Betzer-Zilevitch | |
| 2010/0288499 A1 | 11/2010 | Al-Dhafeeri et al. | |
| 2011/0030958 A1 | 2/2011 | Fedorov et al. | |
| 2011/0203797 A1 | 8/2011 | Alexandrov et al. | |
| 2011/0220360 A1 | 9/2011 | Lindvig et al. | |
| 2012/0211225 A1 | 8/2012 | Kostrov et al. | |
| 2012/0305255 A1* | 12/2012 | Zavolzhskiy | E21B 43/26 166/308.1 |
| 2013/0123151 A1 | 5/2013 | Crews | |
| 2013/0126169 A1 | 5/2013 | Al-Nakhli et al. | |
| 2013/0180720 A1 | 7/2013 | Al-Dahlan et al. | |
| 2014/0069644 A1 | 3/2014 | Reddy | |
| 2014/0090839 A1 | 4/2014 | Al-Nakhil et al. | |
| 2014/0116701 A1* | 5/2014 | Tang | C09K 8/725 166/292 |
| 2014/0144632 A1 | 5/2014 | Zavolzhski et al. | |
| 2014/0290951 A1* | 10/2014 | Al-Taq | C09K 8/52 166/300 |

FOREIGN PATENT DOCUMENTS

| | | |
|---|---|---|
| EP | 0654582 A1 | 5/1995 |
| EP | 0 909 873 A1 | 4/1999 |
| JP | 2001019984 | 1/2001 |
| JP | 2005015533 A | 1/2005 |
| RU | 2100583 C1 | 12/1997 |
| RU | 2126084 C1 | 2/1999 |
| RU | 2194156 C1 | 12/2002 |
| SU | 1677260 | 9/1991 |
| WO | 0037777 A1 | 6/2000 |
| WO | 2006131895 A1 | 12/2006 |
| WO | 2007015391 | 2/2007 |
| WO | 2008032067 A1 | 3/2008 |
| WO | 2009009370 A1 | 1/2009 |
| WO | 2009070561 A1 | 6/2009 |
| WO | 2010046618 A1 | 4/2010 |
| WO | 2010047612 A1 | 4/2010 |
| WO | 2012012224 A1 | 1/2012 |
| WO | 2012025150 A1 | 3/2012 |
| WO | 2012082402 A2 | 6/2012 |
| WO | 2013078306 A1 | 5/2013 |

OTHER PUBLICATIONS

Marques, L.C.C., et al., "A New Technique to Solve Gas Hydrate Problems in Subsea Christmas Trees." SPE 77572, SPE Production & Facilities, Nov. 2004, pp. 253-258, Society of Petroleum Engineers.

Al-Nakhli, Chemically-Induced Pressure Pulse to Increase Stimulated Reservoir Volume in Unconventional Reservoirs, Unconventional Resources Technology Conference, Denver, CO, Aug. 25-27, 2014.

Schlumberger Systems, Sand Control Pumping, pp. 37-70, USA, available at www.slb.com/~/media/files/sand_control/ . . . /scps_03_systems.ashx. Feb. 27, 2012.

European Search Report and Written Opinion dated Aug. 2, 2013, for related European Patent Application 13174172.

Anning Zhou et al., Deep Desulfurization of Diesel Fuels by Selective Adsorption with Activated Carbons, American Chemical Society, Washington, DC, vol. 49, No. 3, Jul. 1, 2004, pp. 329-332.

Yosuke Sano et al., Selection and Further Activation of Activated Carbons for Removal of Nitrogen Species in Gas Oil as a Pretreatment for its Deep Hydrodesulfurization, Energy & Fuels, vol. 18, Mar. 20, 2004, pp. 644-651.

Cheng Yun-Fu, Preparation and Field Uses of Heat Generating Hydrofracturing Fluids, Oilfield Chemistry Research Institute of Drilling and Production, Dagang Oil Fields, Dagang Oilfield Group Co., Ltd., vol. 14, No. pp. 24-27, Mar. 25, 1997.

Isao Mochida, "Removal of SOx and NOx over activated carbon fibers," Carbon, vol. 38, 2000 pp. 227-239.

(56) References Cited

OTHER PUBLICATIONS

Yosuke Sano, "Adsorptive Removal of Sulfur and Nitrogen Species from a Straight Run Gas Oil Over Activated Carbons for its Deep Hydrodesulfurization," Applied Catalysis B: Environmental 49, 2004, pp. 219-225.
E. Raymundo-Pinero, "Temperature Programmed Desorption Study on the Mechanism of SO2 oxidation by Activated Carbon and Activated Carbon Fibres," Carbon, vol. 39, 2001, pp. 231-242.
N. Shirahama, "Mechanistic Study on Adsorption and Reduction of NO2 Over Activated Carbon Fibers, "Carbon, vol. 40, 2002, pp. 2605-2611.
Isao Mochida, Kinetic Study of the Continuous Removal of SOx on Polyacrylonnitrile-Based Activated Carbon Fibres, Fuel vol. 76, No. 6, 1997, pp. 533-536.
Satoru Murata, "A Novel Oxidative Desulfurization System for Diesel Fuels with Molecular Oxygen in the Presence of Cobalt Catalysts and Aldehydes," Energy & Fuels, vol. 18, No. 1, 2004, pp. 116-121.
Kazaumasa Yazu, "Immobolized Tungstophosphoric Acid-Catalyzed Oxidative Desulfurization of Diesel Oil with Hydrogen Peroxide," Journal of Japan Petroleum Institute, vol. 46, No. 6, 2003, pp. 379-382.
Antonio Chica, "Catalytic Oxidative Desulfurization (ODS) of Diesel Fuel on a Continuous Fixed-Bed Reactor," Journal of Catalysis, vol. 242, 2006, pp. 229-308.
Jeyagowry Sampanthar, "A Novel Oxidative Desulfurization Process to Remove Refractory Sulfur Compounds From Diesel Fuel," Applied Catalysis B: Environmental 63, 2006, pp. 85-93.
Shujiro Otsuki, "Oxidative Desulfurization of Light Gas Oi and Vacuum Gas Oil by Oxidation and Solvent Extraction," Energy & Fuels, vol. 14, No. 6, 2000, pp. 1232-1239.
Kazumasa Yazu, "Oxidative Desulfurization of Diesel Oil with Hydrogen Peroxide in the Presence of Acid Catalyst in Diesel Oil/Acetic Acid Biphase System," Chemistry Letters, vol. 33, No. 10, 2004, pp. 1306-1307.
Paolo DeFilippis, "Oxidative Desulfurization: Oxidation Reactivity of Sulfur Compounds in Different Organic Matrixes," Energy & Fuels, vol. 17, No. 6, 2003, pp. 1452-1455.
Mure Te, "Oxidation Reactivities of Dibenzothiophenes in Polyoxometalate/H2O2 and Formic Acid/H2O2 Systems," Applied Catalysis A: General 219, 2001, pp. 267-280.
Xiang Gao, "Adsorption and Reduction of NO2 Over Activated Carbon at Low Temperature," Fuel Processing Technology 92, 2011,pp. 139-146.
U.S. Appl. No. 14/689,874, filed Apr. 17, 2015, titled "Chemically-Induced Pulsed Fracturing Method".
PCT International Search Report and the written opinion dated Apr. 8, 2014; International Application No. PCT/US2013/043076; International filing date May 29, 2013.
PCT Notification of Transmittal of the International Search Report and the Written Opinion of the International Searching Authority, or the Declaration; dated Mar. 18, 2013; International Appln No. PCT/US2013/021961; Int'l File Date: Jan. 17, 2013.
PCT Notification of Transmittal of the International Search Report and the Written Opinion of the International Searching Authority, or the Declaration; dated Mar. 5, 2013; International Appln No. PCT/US2012/066249; Int'l File Date: Nov. 21, 2012.
Sano, "Two-step Adsorption Process for Deep Desulfurization of Diesel Oil," Fuel 84 (2005) 903-910.
Examination Report dated Jun. 28, 2011 for related European Patent Application No. 08857250.9.
Isao Mochida, "Adsorption and Adsorbed Species of SO2 during its Oxidative Removal over Pitch-Based Activated Carbon Fibers," Energy & Fuels, vol. 13, No. 2, 1999, pp. 369-373.

\* cited by examiner

Pre Reaction

Post Reaction

COMPOSITION FOR ENHANCED FRACTURE CLEANUP USING REDOX TREATMENT

PRIORITY

This divisional U.S. non-provisional patent application declares priority to the application published as U.S. Pub. No. 2015/0300142 A1, filed Apr. 17, 2015, which itself claims priority to U.S. Provisional Patent Application No. 61/980,664, filed Apr. 17, 2014, the entire disclosures of which is expressly incorporated here by reference.

FIELD

This disclosure relates to a composition to improve the recovery of hydrocarbons from a fractured formation. More specifically, this disclosure relates to a composition to reduce the viscosity of a fracturing fluid.

BACKGROUND

Hydraulic fracturing fluids containing proppants are used extensively to enhance productivity from hydrocarbon reservoir formations, including carbonate and sandstone formations. During hydraulic fracturing operations, a fracturing treatment fluid is pumped under a pressure and rate sufficient for cracking the formation of the reservoir and creating a fracture. Fracturing operations usually consist of three main stages including a pad fluid stage, a proppant fluid stage, and an overflush fluid stage. The pad fluid stage typically consists of pumping a pad fluid into the formation. The pad fluid is a viscous gelled fluid which initiates and propagates the fractures. Auxiliary fractures can propagate from the fractures to create fracture networks. A fracture network can comprise fractures and auxiliary fractures. Auxiliary fractures can connect the fractures.

The proppant fluid stage involves pumping a proppant fluid into the fractures of the formation. The proppant fluid contains proppants mixed with a viscous gelled fluid or a visco-elastic surfactant fluid. The proppants in the proppant fluid are lodged in the fractures and create conductive fractures through which hydrocarbons flow. The final stage, the overflush stage, includes pumping a viscous, gelled fluid into the fractures to ensure the proppant fluid is pushed inside the fractures. While the three stages have different aims, all three make use of highly viscous and/or gelled fluids to achieve those aims.

A downside of the traditional method is that a high volume of gelled or polymeric materials can be left behind in the fractures. The gelled materials can be concentrated around the proppant in the fractures or can be freely in the fractures. The gelled material acts to block the fractures reducing the fracture conductivity. The hydrocarbons which flow from the reservoir formation are unable to move the gelled materials. Traditional methods for cleaning the fractures involve viscosity breakers or other elements to break down the fluid. These traditional methods suffer from an inability to completely cleanup the fractures, leaving residual viscous material and reduced conductivity.

SUMMARY

This disclosure relates to a composition and method to improve the recovery of hydrocarbons from a fractured formation. More specifically, this disclosure relates to a composition and method to reduce the viscosity of a fracturing fluid, such as, for example, a gelled and/or viscous fracturing fluid.

In one aspect, a method for improved hydrocarbon recovery from a formation due to cleanup of a residual viscous material is provided. The method includes the step of fracturing the formation with a fracturing fluid to generate fractures. The fracturing fluid includes a viscous fluid component, the viscous fluid component operable to fracture the formation to create fractures leaving behind the residual viscous material in the fractures, the viscous fluid component having a viscosity, a proppant component, the proppant component includes a proppant, the proppant operable to hold open the fractures, where the proppant component is carried to the fractures by the viscous fluid component, and a cleanup fluid.

The cleanup fluid includes an acid precursor, the acid precursor operable to trigger an exothermic reaction component, and the exothermic reaction component operable to generate heat, where the heat is operable to reduce a viscosity of the residual viscous material to create a reduced viscosity material, the reduced viscosity material operable to flow from the formation. Fractures can include auxiliary fractures, which propagate from the fractures.

In certain aspects, the exothermic reaction component includes an ammonium containing compound and a nitrite containing compound. In certain aspects of the present disclosure, the ammonium containing compound is $NH_4Cl$ and the nitrite containing compound is $NaNO_2$. In certain aspects of the disclosure, the acid precursor is triacetin.

In a second aspect of the present disclosure, a cleanup fluid for reducing a viscosity of a residual viscous material in fractures is provided. The cleanup fluid includes an acid precursor, the acid precursor operable to trigger an exothermic reaction component, and the exothermic reaction component operable to generate heat, where the heat is operable to reduce a viscosity of the residual viscous material to create a reduced viscosity material, the reduced viscosity material operable to flow from the fractures.

In certain aspects, the exothermic reaction component includes an ammonium containing compound and a nitrite containing compound. In certain aspects of the present disclosure, the ammonium containing compound is $NH_4Cl$ and the nitrite containing compound is $NaNO_2$. In certain aspects of the present disclosure, the acid precursor is triacetin.

In a third aspect, a method to cleanup fractures post hydraulic fracturing is provided. The method includes the steps of fracturing a formation in a hydraulic fracturing operation to produce fractures, and injecting a cleanup fluid into the fractures to reduce a viscosity of a residual viscous material.

In certain aspects of the present disclosure, the step of fracturing the formation includes the step of fracturing the formation with a fracturing fluid to generate fractures. The fracturing fluid includes a viscous fluid component, the viscous fluid component operable to fracture the formation to create fractures leaving behind the residual viscous material in the fractures, the viscous fluid component having a viscosity, and a proppant component, the proppant component comprising a proppant, the proppant operable to hold open the fractures, where the proppant component is carried to the fractures by the viscous fluid component. In certain aspects of the present disclosure, the cleanup fluid includes an acid precursor, the acid precursor operable to trigger an exothermic reaction component, and the exothermic reaction component operable to generate heat, where the heat is operable to reduce a viscosity of the residual viscous material to create a reduced viscosity material, the reduced viscosity material operable to flow from the fractures. In certain aspects of the present disclosure, the exothermic reaction component includes an ammonium containing compound and a nitrite containing compound. In certain aspects, the ammonium containing compound is $NH_4Cl$ and the nitrite containing compound is $NaNO_2$. In certain aspects, the acid precursor is triacetin.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
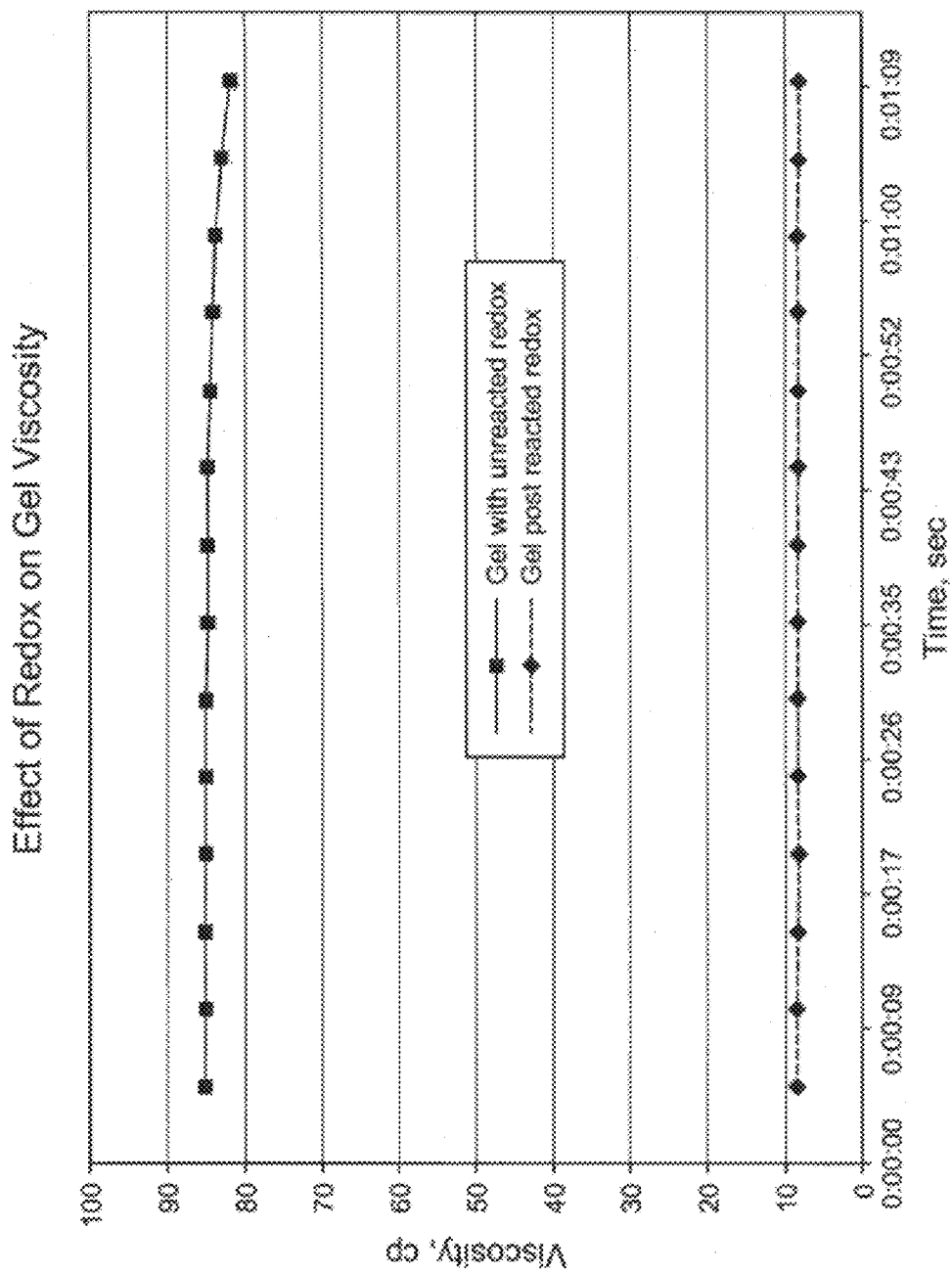
FIG. 1 is a graphic representation of the effect of the cleanup fluid on the viscosity of the residual viscous material.

While the disclosure will be described with several embodiments, it is understood that one of ordinary skill in the relevant art will appreciate that many examples, variations and alterations to the apparatus and methods described here are within the scope and spirit of the disclosure. Accordingly, the embodiments described here are set forth without any loss of generality, and without imposing limitations, on the claims.

In one aspect, a method for improved hydrocarbon recovery from a formation due to cleanup of a residual viscous material is provided. The hydraulic fracturing operation fractures the formation using fracturing fluid to create fractures. Formations include sandstone and carbonate, for example.

The fracturing fluid includes a viscous fluid component and a proppant component. The viscous fluid component has a viscosity. The viscous fluid component is operable to increase the viscosity of the fracturing fluid. Viscous fluid components include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose.

Guar-based fluids include hydroxypropyl guar, carboxymethyl guar, guar cross-linked boron ions from an aqueous borax/boric acid solution, and guar cross-linked with organometallic compounds. Organometallic compounds include zirconium, chromium, antimony, and titanium salts. Gel oil-based fluids include aluminum phosphate-ester oil gels. In at least one embodiment of the present disclosure, the viscous fluid component is an aqueous guar solution, having a concentration of guar gum between about 0.1% and about 15%, between about 0.1% and about 10%, between about 1% and about 10%, between about 2% and about 8%, and between about 4% and about 6%.

The proppant component includes a proppant. The proppant is operable to hold open fractures created by the viscous fluid component. Any proppants capable of holding open fractures to create a conductive fractures are suitable for use in the present disclosure. In some embodiments, the proppant component includes a viscous carrier fluid having a viscosity. Viscous carrier fluids include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose.

Guar-based fluids include hydroxypropyl guar, carboxymethyl guar, guar cross-linked boron ions from an aqueous borax/boric acid solution, and guar cross-linked with organometallic compounds. Organometallic compounds include zirconium, chromium, antimony, and titanium salts. Gel oil-based fluids include aluminum phosphate-ester oil gels. In some embodiments, the hydraulic fracturing operation uses a one stage fracturing fluid, in which the fracturing fluid includes both the viscous fluid component and the proppant component, in which the viscous fluid component carries the proppant component to the fractures.

In at least one embodiment, the hydraulic fracturing operation uses a multi-stage fracturing fluid in which the viscous fluid component is injected into the formation, followed by the proppant component in the viscous carrier fluid. In some embodiments, the injection of the proppant component is followed by injection of additional viscous fluids to ensure the proppants are placed in the fractures. The additional viscous fluids have a viscosity.

In some embodiments, the viscosity of the viscous fluid component, the viscous carrier fluid, and additional viscous fluids are the same. In some embodiments, the viscosity of the viscous fluid component, the viscous carrier fluid, and additional viscous fluids are different. The injection of the fracturing fluid ceases after the proppants are placed in the fractures and the fracturing fluid is allowed to seep from the fractures. In some embodiments, the injection of the hydraulic fracturing fluid including the viscous fluid component and/or the proppant component and/or the overflush component and/or the exothermic reaction component does not generate foam or introduce foam into the hydraulic formation including the hydraulic fractures.

The hydraulic fracturing operation can leave residual viscous material in the fractures of a hydraulic formation. Residual viscous materials can include carboxymethyl cellulose, hydroxyethyl cellulose, carboxymethyl hydroxyethyl cellulose, hydroxypropyl cellulose, methyl hydroxyl ethyl cellulose, guar gum, hydroxypropyl guar, carboxymethyl guar, guar cross-linked with boron, aluminum phosphate-ester oil gel, and guar cross-linked with organometallic compounds. Organometallic compounds include zirconium, chromium, antimony, and titanium salts. In some embodiments of the present disclosure, the residual viscous material is a gelled material. In some embodiments of the present disclosure, the residual viscous material is a polymeric material. In at least one embodiment of the present disclosure, the residual viscous material is guar gum. The residual viscous material has a viscosity greater than the fracturing fluid. In at least one embodiment of the present disclosure, the residual viscous material is surrounding and/or adjacent to the proppants placed in the fractures.

The cleanup fluid acts, after the proppants have been placed in the fractures, to remove the residual viscous material. In one embodiment, the cleanup fluid is mixed with the fracturing fluid. In at least one embodiment of the present disclosure, where a multi-stage fracturing fluid is used, the cleanup fluid is a component of the fluids used at each stage of the hydraulic fracturing operation. In an alternate embodiment, the cleanup fluid is added only to the fluid of the final stage of the hydraulic fracturing operation, such as, for example, the overflush stage. In some embodiments, the cleanup fluid is pumped to the fractured formation as a separate step following the hydraulic fracturing operation.

In some embodiments, the cleanup fluid includes an acid precursor and an exothermic reaction component. The reaction of the exothermic reaction component results in a release of kinetic energy and thermal energy. The reaction of the exothermic reaction component generates heat and increases the pressure. The generated heat increases the temperature of the surrounding fluids, including fracturing fluid remaining in the fractures and residual viscous material. The increase in temperature reduces the viscosity of the fracturing fluid. The increase in temperature reduces the viscosity of the residual viscous material left in the fractures to create a reduced viscosity material. The reduced viscosity material flows from the fractures of the formation to the wellbore. The increase in pressure provides lift energy to push the reduced viscosity materials through the wellbore toward the surface. The removal of the residual viscous material increases the conductivity of the fractures. Increased conductivity of the fractures increases seepage of the fracturing fluid, improves fracturing efficiency, minimizes need for additional fracturing jobs, minimizes time between fracturing and well production, and increases hydrocarbon flow, which translates to increased hydrocarbon recovery.

The acid precursor is any acid that releases hydrogen ions to trigger the reaction of the exothermic reaction component. Acid precursors include triacetin (1,2,3-triacetoxypropane), methyl acetate, HCl, and acetic acid. In at least one embodiment, the acid precursor is triacetin. In at least one embodiment, the acid precursor is acetic acid.

The exothermic reaction component includes one or more redox reactants that exothermically react to produce heat and increase pressure. Exothermic reaction components include urea, sodium hypochlorite, ammonium containing compounds, and nitrite containing compounds. In at least one embodiment of the present disclosure, the exothermic reaction component includes ammonium containing compounds. Ammonium containing compounds include ammonium chloride, ammonium bromide, ammonium nitrate, ammonium sulfate, ammonium carbonate, and ammonium hydroxide.

In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In at least one embodiment of the present disclosure, the exothermic reaction component includes two redox reactants: $NH_4Cl$ and $NaNO_2$, which react according to the following:

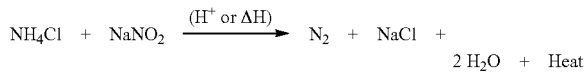

$$NH_4Cl + NaNO_2 \xrightarrow{(H^+ \text{ or } \Delta H)} N_2 + NaCl + 2H_2O + Heat$$

In a reaction of the exothermic reaction components according to the given equation, generated gas and heat contribute to the reduction of the viscosity of the residual viscous material.

The exothermic reaction component is triggered to react. In at least one embodiment of the present disclosure, the exothermic reaction component is triggered within the fractures. In at least one embodiment of the present disclosure, the acid precursor triggers the exothermic reaction component to react by releasing hydrogen ions.

In at least one embodiment, the exothermic reaction component is triggered by heat. The wellbore temperature is reduced during a pre-pad injection or a pre-flush with brine and reaches a temperature less than 120° F. (48.9° C.). The fracturing fluid of the present disclosure is then injected into the well and the wellbore temperature increases. When the wellbore temperatures reaches a temperature greater than or equal to 120° F., the reaction of the redox reactants is triggered. In at least one embodiment, the reaction of the redox reactants is triggered by temperature in the absence of the acid precursor. In at least one embodiment, the exothermic reaction component is triggered by heat when the exothermic reaction component is within the fractures.

In at least one embodiment, the exothermic reaction component is triggered by pH. A base is added to the fracturing fluid of the present disclosure to adjust the pH to between 9 and 12. In at least one embodiment, the base is potassium hydroxide. The fracturing fluid with the base is injected into the formation. Following the injection of the fracturing fluid, an acid is injected to adjust the pH to less than 6. When the pH is less than 6, the reaction of the redox reactants is triggered. In at least one embodiment, the exothermic reaction component is triggered by pH when the exothermic reaction component is within the fractures.

In at least one embodiment of the present disclosure, the cleanup fluid is introduced to the fractures following the hydraulic fracturing operation. Dual-string coiled tubing is used to introduce the exothermic reaction component and the acid precursor to the wellbore. In at least one embodiment, the exothermic reaction component includes $NH_4Cl$ and $NaNO_2$. The acid precursor is acetic acid. The acetic acid is mixed with $NH_4Cl$ and injected in parallel with the $NaNO_2$, using different sides of the dual-string coiled tubing. The exothermic reaction component and the acid precursor mix within the fractures.

EXAMPLES

Example 1

Figure 3A:
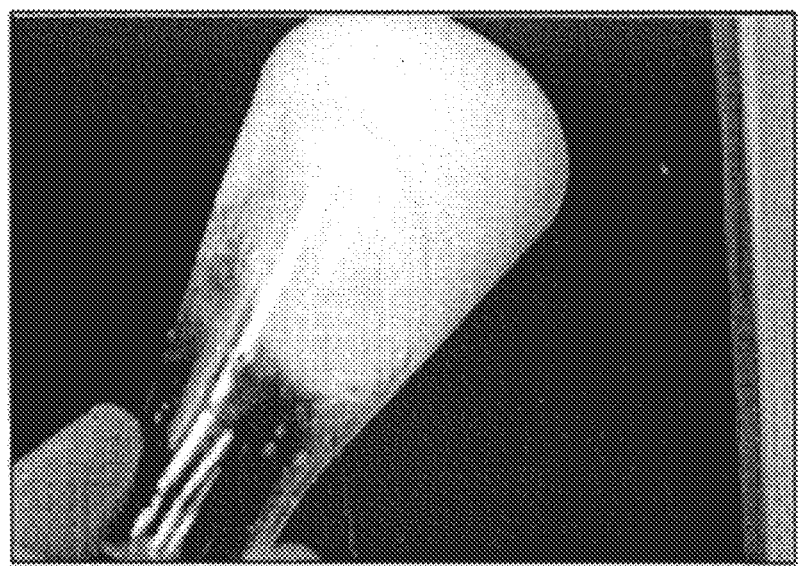
FIGS. 3a and 3b are pictorial representations of the residual viscous material before the reaction of an exothermic reaction component of the cleanup fluid.

An exothermic reaction component of a cleanup fluid consisting of 3M $NH_4Cl$ and 3M $NaNO_2$ was added to a solution of 1% by volume guar at room temperature, see FIG. 3. The exothermic reaction component was triggered by heat. The viscosity of the solution was measured before, during, and after the reaction using a Chandler viscometer.

Figure 3B:
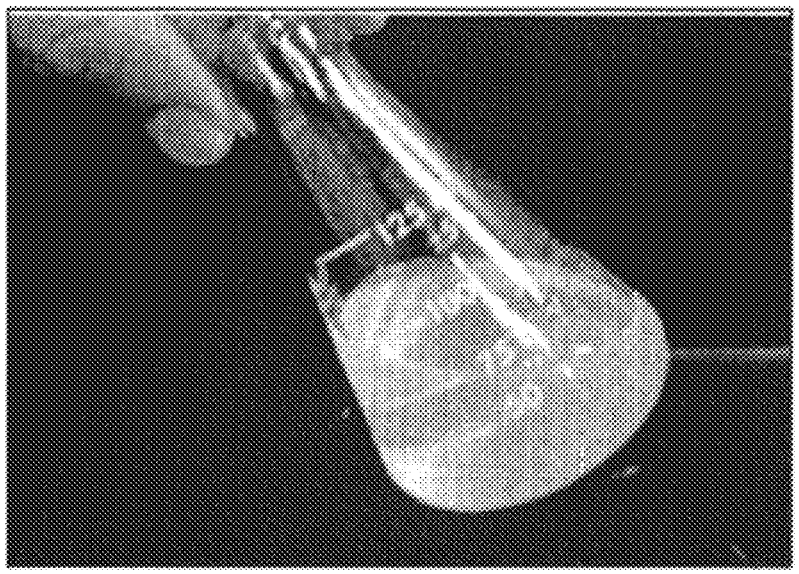

Prior to reaction of the exothermic reaction component, the viscosity of the residual viscous material was 85 cP. FIG. 1 is a graph of the viscosity following the reaction of the exothermic reaction component. The graph shows that the viscosity of the residual viscous material was reduced to less than 8.5 cP. FIG. 3b shows the solution, including the residual viscous material after the reaction of the exothermic reaction component.

Example 2

Figure 2:
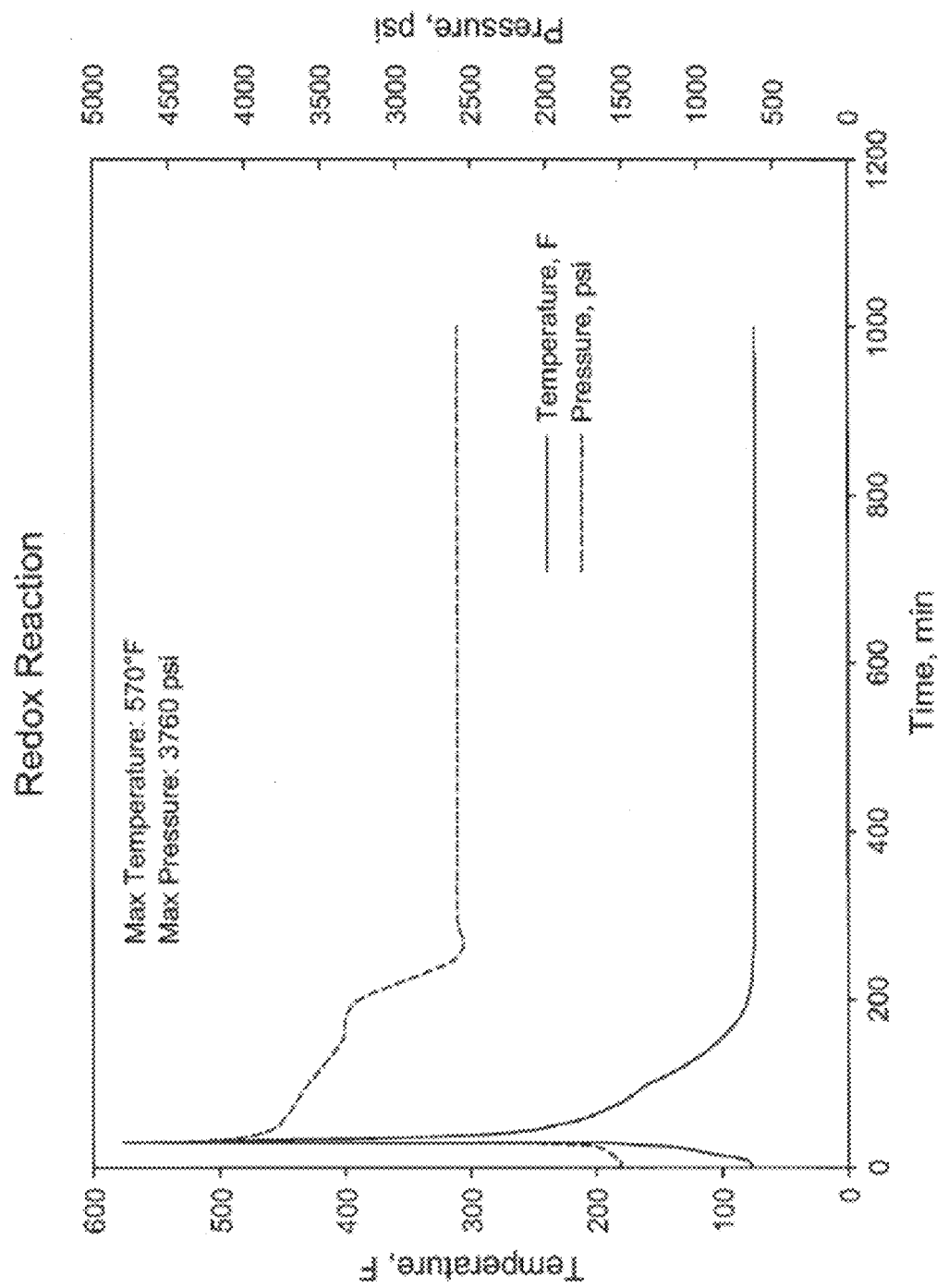
FIG. 2 is a graphic representation of the heat and pressure generated by the exothermic reaction component.

A solution of an exothermic reaction component was prepared from 3M $NH_4Cl$ and 3M $NaNO_2$. The solution was placed in an autoclave reactor at room temperature and an initial pressure of 1,000 psi. The reactor temperature was increased. The reaction was triggered at about 120° F., see FIG. 2. Due to the reaction, the temperature in the reactor reached a temperature of 545° F. and a pressure of 3,378 psi, see FIG. 2.

Example 3

Figure 4:
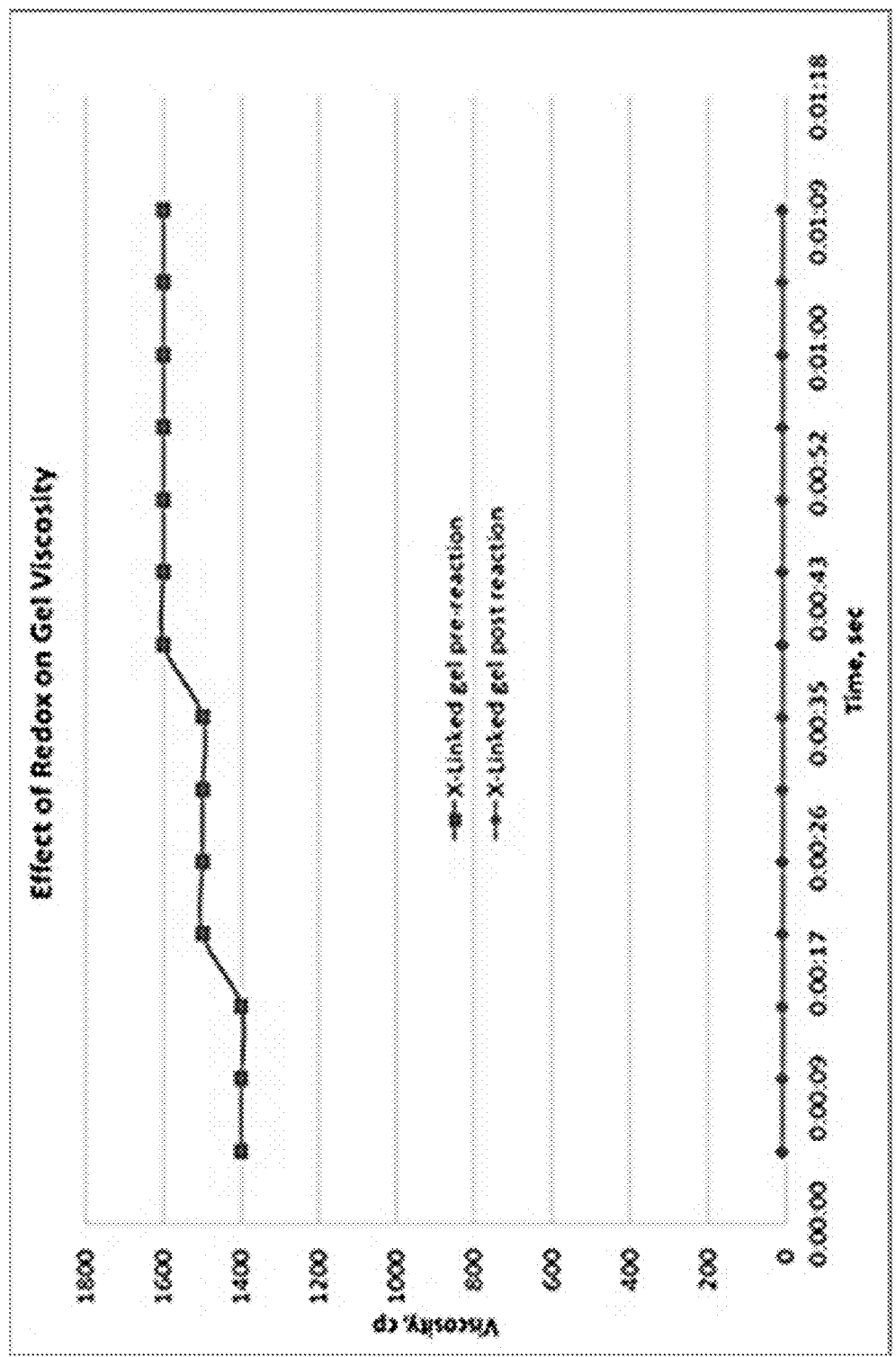
FIG. 4 is a graphic representation of the effect of the reaction of the exothermic reaction component on the viscosity of a fracturing fluid.

The exothermic reaction component showed compatibility with the viscous fluid component (here a cross-linked gel). The fracturing fluid with the viscous fluid component, the exothermic reaction component, and the proppant component was also prepared and showed compatibility. The fracturing fluid, without the proppant component, was activated in the autoclave reactor by heating to the wellbore temperature to trigger the reaction of the exothermic reaction component. The heat generated by the reaction reduced the viscosity of the viscous fluid component to produce a reduced viscosity material, without injecting the viscosity breaker. Using a chandler viscometer, the viscosity of the fracturing fluid, containing the viscous fluid component and the exothermic reaction component, was measured pre-reaction and post-reaction. The viscosity of the fracturing fluid was reduced from 1600 cp to 10 cp, as shown in FIG. 4. The results show that the exothermic reaction component and this type of treatment can clean-up the fractures post a fracturing job.

Although the present disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed here as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made here.

As used here and in the appended claims, the words "comprise," "has," and "include" and all grammatical variations thereof are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A cleanup fluid for reducing a viscosity of a residual viscous material in fractures of a hydrocarbon-bearing reservoir, the cleanup fluid comprising:
    an optional acid precursor, the optional acid precursor present only at a concentration to be consumed, if present, while triggering an exothermic reaction component in addition to or alternative to heat in the wellbore, and the optional acid precursor comprising at least one component selected from the group consisting of: triacetin; methyl acetate; hydrochloric acid; acetic acid; and mixtures thereof; and
    the exothermic reaction component operable to generate heat, and the exothermic reaction component comprising at least one component selected from the group consisting of: urea;
    sodium hypochlorite; ammonium chloride; ammonium bromide; ammonium nitrate;
    ammonium sulfate; ammonium carbonate; ammonium hydroxide; sodium nitrite; potassium nitrite; and mixtures thereof, and the exothermic reaction component comprising at least one ammonium containing compound at about 3 molar (M) concentration and at least one nitrite containing compound at about 3 molar (M) concentration,
    where the cleanup fluid comprises only liquid components in solution prepared to be fluidly compatible with a viscous fluid component such that the cleanup fluid and viscous fluid component quickly mix and the heat reduces a viscosity of the viscous fluid component to create a reduced viscosity material in less than about 1 minute,
    where the cleanup fluid does not include viscosifying components at concentrations that generate foam or introduce foam into the fractures of the hydrocarbon-bearing reservoir.

2. The cleanup fluid of claim 1, where the ammonium containing compound comprises $NH_4Cl$ and the nitrite containing compound comprises $NaNO_2$.

3. The cleanup fluid of claim 1, including the optional acid precursor, where the optional acid precursor comprises triacetin.

4. The cleanup fluid of claim 1, further comprising a base to initially increase pH of the cleanup fluid.

5. The cleanup fluid of claim 1, where the cleanup fluid reduces the viscosity of the residual viscous material to the reduced viscosity, the reduced viscosity being about 1/10 of the viscosity of the residual viscous material.

6. The cleanup fluid of claim 1, where the exothermic reaction component is triggered at greater than about 120° F. in the fractures.

7. The cleanup fluid of claim 1, where the exothermic reaction component is triggered at a pH less than about 6 in the fractures.

8. The cleanup fluid of claim 1, where the exothermic reaction component is triggered at greater than about 120° F. while the pH of the cleanup fluid is less than about 6 in the fractures.

9. The cleanup fluid of claim 1, where the ammonium containing compound is selected from the group consisting of: ammonium chloride; ammonium bromide; ammonium nitrate; ammonium sulfate; ammonium carbonate; ammonium hydroxide; and mixtures thereof.

10. The cleanup fluid of claim 1, where the nitrite containing compound is selected from the group consisting of: sodium nitrite; potassium nitrite; and mixtures thereof.

11. The cleanup fluid of claim 1, further comprising the viscous fluid component.

12. The cleanup fluid of claim 11, where the viscous fluid component is selected from the group consisting of: carboxymethyl cellulose; hydroxyethyl cellulose; carboxymethyl hydroxyethyl cellulose; hydroxypropyl cellulose; methyl hydroxyl ethyl cellulose; and mixtures thereof.

13. The cleanup fluid of claim 11, where the viscous fluid component is selected from the group consisting of: hydroxypropyl guar; carboxymethyl guar; guar cross-linked boron ions from an aqueous borax/boric acid solution; guar cross-linked with organometallic compounds; and mixtures thereof.

14. The cleanup fluid of claim 1, further comprising a viscous carrier fluid.

15. The cleanup fluid of claim 1, further comprising a fracturing fluid.

* * * * *